3,592,882
CONTINUOUS CASTING METHOD FOR MAKING
PEARLIZED RESIN MATERIALS
Yoshio Morita, Tokyo, Japan, assignor to Nihon Koken
Kogyo Company, Ltd., Tokyo, Japan
Filed Aug. 13, 1968, Ser. N. 752,315
Int. Cl. B29f 3/12; B29d 19/00
U.S. Cl. 264—1                                                   5 Claims

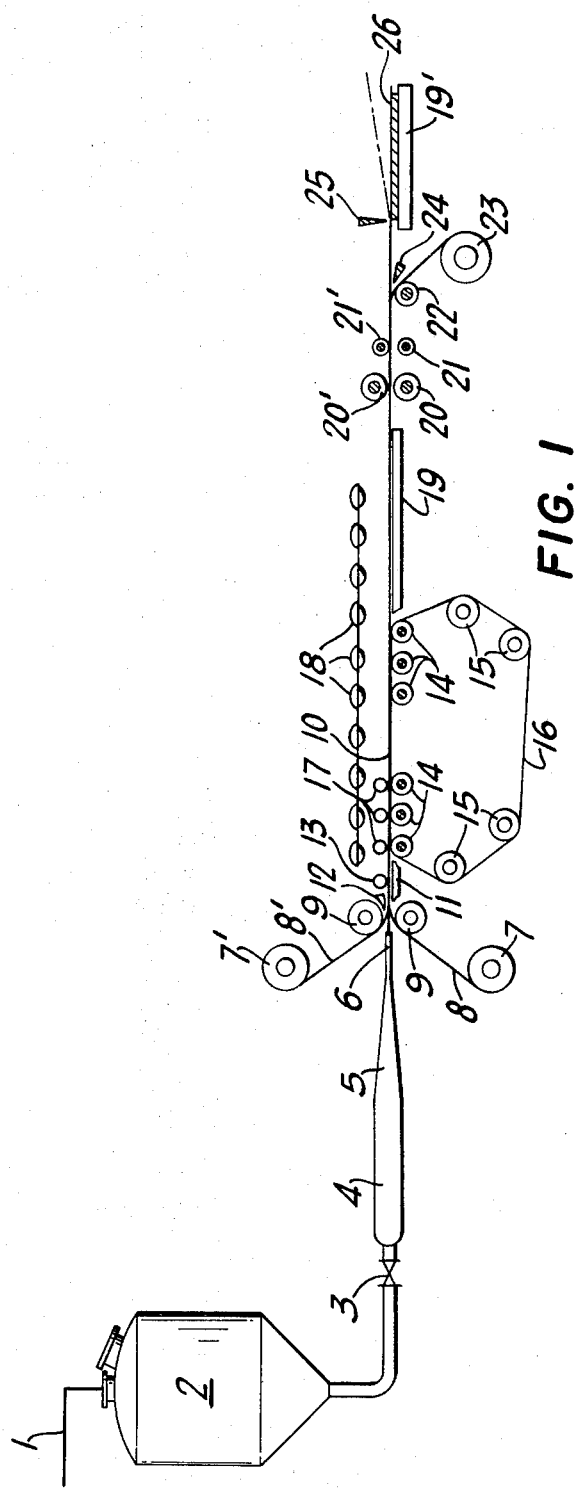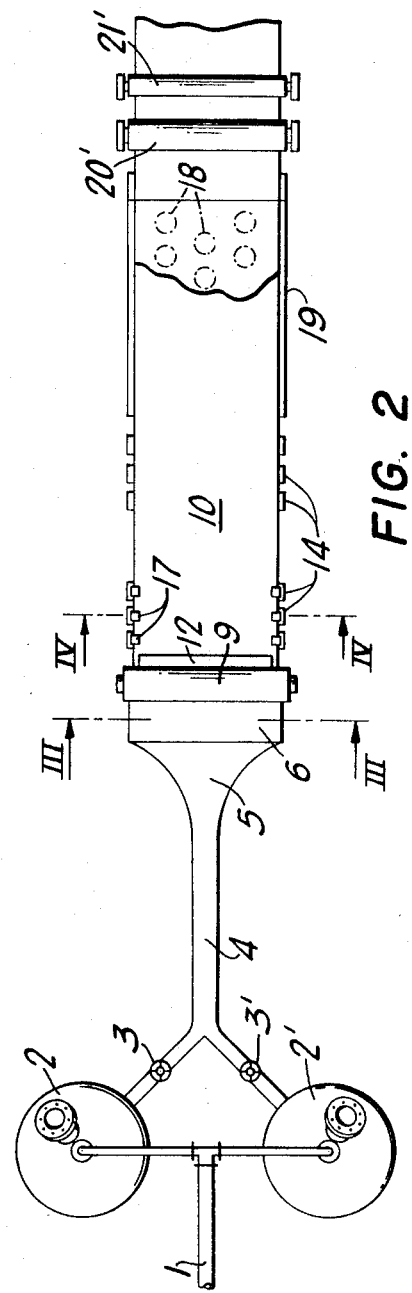

ABSTRACT OF THE DISCLOSURE

A continuous method for casting a liquid plastic mixture of a light-transmitting resin and pearl essence is provided. The plastic mixture is passed through an extruder containing a plurality of thin plates in a prearranged spaced relationship for orienting the pearl essence within the resin. The extrudate is covered on each side by plastic films to insulate it from the open air, and is passed continuously past a heat source to solidify the resin and fix the orientation of the pearl essence. A novel apparatus is provided for carrying out the process. The pearlized resin materials made according to the invention are useful for buttons, interior architectural materials, and ornamental goods.

BACKGROUND OF THE INVENTION

The best known method for producing pearlized sheets for button blanks is the centrifugal casting method described by E. Gerson et al. in U.S. 2,856,635 and U.S. 3,202,741. In that method a liquid polyester resin containing natural or synthetic pearl essence is poured into a rotating cylinder and solidified. Although the method has been commercially successful, it does have a number of drawbacks. The side of the cast sheet facing the surface of the inside of the cylinder exhibits perfect orientation of the pigment particles and shows a uniform lustrous surface; the other side, which is exposed to the open air, shows irregular orientation and luster much lower than that which would be expected from the quality of the pigment used. Also, much manual labor is required for each batch in weighing out a predetermined amount of resin and catalyst, mixing the resin and catalyst, pouring the plastic mix into the cylinder and removing the solidified resin from the cylinder.

A specialized use for pearlized polyester or acrylic sheets involves the preparation of interior panels, consisting of plywood coated with pearlized resin. Such panels are made by coating the plywood with the resin and covering it with cellophane paper to protect it from the open air. The orientation of the pearl pigment particles obtained by this method is considerably inferior to the orientation obtained during centrifugal casting. Special items, such as umbrella grips and door knobs, are made from liquid polyester resin containing pearl essence by ingot processes, but the luster of the resulting product is inferior because of the poor orientation of the pearl essence.

SUMMARY

I have discovered a continuous method for providing pearlescent resin materials in sheet, plate, or rod form in which the product exhibits excellent luster because of the uniform orientation of the pigment particles. According to my method, a liquid plastic mix consisting essentially of a light-transmitting resin and pearl essence is cast by continuously passing the plastic mix through an extrusion zone containing a plurality of thin plates in a pre-arranged spaced relationship for orienting the pearl essence within the resin. The extrudate is then deposited between two plastic films to provide insulation from the open air. The form of the insulated extrudate is continuously maintained while positioning it adjacent a heat source. Heat is continuously applied to solidify the resin, thereby fixing the orientation of the pearl essence, and the cast resin is removed from the heat source at a rate in synchronization with the linear flow speed of the extrudate leaving the extrusion zone.

The apparatus for carrying out the process of the invention comprises an extrusion nozzle having positioned therein a plurality of thin plates disposed in pre-arranged spaced relationship to each other, means for feeding plastic film to the upper and lower surfaces of the extrudate from the nozzle, a receiving station having upwardly curving lateral edges to maintain the form of the extrudate and to facilitate adherence of the lower plastic film to the lower surface thereof, pressing means to facilitate adherence of the upper plastic film to the upper surface thereof, a heat source for solidifying the materials, means for positioning the extrudate contained by the plastic films adjacent the heat source and means for moving the extrudate past the heat source at a rate synchronized with the linear flow speed of the extrudate from the nozzle.

BRIEF DESCRIPTION OF THE DRAWINGS

FIG. 1 is an overall view of one embodiment of the apparatus of the invention;

FIG. 2 is, with slight modification, a top view of the apparatus shown in FIG. 1;

FIG. 3(a) shows an alternate embodiment of the same section;

Referring to FIGS. 1 and 2, the supply tank 2 is filled with a pearlized light-transmitting resin, for example, a pearilized polyester resin. It is convenient, as shown in FIG. 2 to use two tanks 2 and 2'; one containing catalyst in admixture with pearlized polyester resin, and the other containing an accelerator and/or promoter in admixture with the pearilzed resin. If necessary, vacuum can be applied to the tanks through pipe 1 to eliminate air bubbles from the plastic mix. Pressure is applied by intorducing the air back through the same pipe 1 by means of a compressor or other device (not shown) and the resin in tanks 2 and 2' is readly for extrusion through the mixing tube 4 after the opening of valves 3 and 3'. Since the flow rate can be controlled by adjusting the opening of valves 3 and 3', it is not always necessary to maintain pressure inside the tanks 2 and 2'. It is also possible to vary the compositions of the mixtures in tanks 2 and 2' and to control separately the individual flow rates.

To advance the flow of the viscous pearlized polyester resin, a screw feeder (not shown) can be positioned within mixing tube 4. The use of such a mixing device is convenient when two kinds of resin batches are combined from separate storage tanks 2 and 2'. Thus, when a single tank 2 is used, it is easy to accomplish the direct mixing of the resin, catalyst, and accelerator without auxiliary mixing equipment.

Figure 3A:
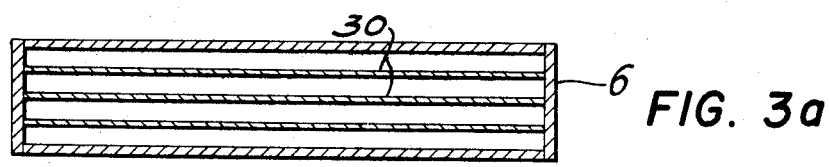
Figure 4:
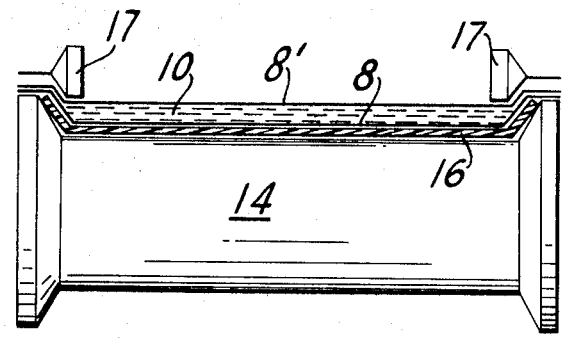
FIG. 4 is a sectional view taken across line IV—IV of FIG. 2.

The resin mix flows through forming part 5 in which it is shaped to the form desired; e.g., sheets or rods, and then arrives at nozzle 6. Inside of the nozzle mouth there are thin, fixed stratifying plates 30, as shown in FIGS. 3(a) and (b). Between the plates 30, which are disposed in pre-arranged spaced relationship to each other, the pearl pigment particles become oriented in planes parallel to the plate surface. The extrudate 10 from nozzle 6 is immediately covered on both sides with plastic films 8 and 8' which are supplied from stock rolls 7 and 7' to prevent undue exposure of the extrudate to the open air. The lower film 8 sticks automatically to the extrudate as a result of the weight of the resin on the roll 9 and the receiving station 11. The upper film 8' is forced to stick tightly to the extrudate by film guide 12 and pressing rolls 13. The receiving station 11 has upwardly curving lateral edges to avoid the overflow of the resin. The film guide 12 and the pressing rolls 13 are adjustable in their height. At the first stage of the process, the plastic films containing the extrudate are driven past the heat source 18 by auxiliary driving rolls 21 and 21'. After the gelled resin reaches driving rolls 20 and 20', the clearance of rolls 21 and 21' is adjusted and the flow is now moved by rolls 20 and 20'. The feed speed of the films containing the extrudate are adjusted to synchronize with the linear speed of the extrudate as it leaves nozzle 6. From station 11 the resin flow is brought onto flexible conveyor belt 16 made of woven fiberglass or other suitable material. The conveyor belt 16, which is synchronized to move with the linear speed of the resin flow, is driven by driving rolls 15 and support rolls 14. The support rolls conform in cross-section to receiving station 11 with upwardly curving lateral edges. A cross-section of the support rolls 14 is shown in FIG. 4. FIG. 4 also shows guide bars 17, which prevent overflow of the extrudate 10 contained between the plastic films 8 and 8'.

FIGS. 1 and 2 show the heat source 18 for polymerizing the resin. Heat is preferably supplied indirectly using an infrared or high frequency heater. The resin is heated to a temperature sufficient to cause gelation by the time that the flow reaches the end of belt 16. The gelled resin contained by the plastic films has sufficient rigidity that it can be driven solely by the driving rolls 20 and 20' over the surface of table 19. It is convenient to lubricate the surface of table 19 by applying to the surface thereof lubricating oils, talcum powder, or small glass beads of less than 0.1 mm. in diameter. In lieu of the table, the belt 16 can be elongated to carry the resin flow to the driving rolls 20 and 20'. For interior materials, such as sheets for laminated wall panels, it is preferable to use table 19 to smooth the surface of the pearlized sheet prior to its termination to plywood at a time when the resin is still soft enough to apply pressure for leveling. It is also possible to place a patterned engraving roll (not shown) above table 19 to press designs into the resin sheet.

For the manufacture of buttons, a blanking machine, which can be operated continuously, is joined to the end part of table 19. The plastic films 8 and 8' attached to the extrudate 10 are easily removed from the button blanks by blow separation. The presence of the plastic film up until the point of cure is of particular advantage, since it prevents the blanks from sticking together while they are still in a flaccid condition.

For the production of polyester coated interior panels, an auixiliary table 19' is placed adjacent the driving rolls 20 and 21. Plywood sheets, preliminary coated with activated polyester resin as an adhesive for the lamination of the cast resin sheet, is placed on this table. The solidified sheet 10 is fed onto the plywood after stripping the lower film 8 using scraper 24 and rolls 22 and 23. The sheet 10 is cut to size by knife 25 and laminated to the plywood by pressing equipment (not shown).

DETAILED DESCRIPTION

Light-transmitting resin materials useful in the invention are well recognized in the art of making pearlized plastics, as illustrated by the teachings of U.S. Pats. 2,971,223 and 3,046,610, issued to Louis Grunin. Useful materials include any resin or mixture of resins that can be polymerized with ultra-violet light with or without the use of suitable catalysts. Examples of these resins are polyester resins, which comprise a cross-linking vinyl monomer and an unsaturated polyester or alkyd formed by condensing and esterifying a polyhydric alcohol and a polycarboxylic acid. Various materials containing ethylenic linkages, such as divinyl benzene, diallyl phthalate, diallyl malonate allyl methacrylate, diallyl carbonate, trialyl cyanurate, tetrallyl silane, or copolymers of these materials, can be used. Monoethylenic resin-forming materials, such as methylmethacrylate and styrene are also useful. Condensation polymers suitable for casting include epoxy resins, phenol-formaldehyde resins, and melamine.

In the case of polyester resins, typical commercial mixes of useful viscosity contain about 80% by weight of polyester and 20% by weight of styrene or other suitable diluent and usually a trace of inhibitor, for instance, 0.5% hydroquinone to prevent temporarily the setting of the resin mix before use. The styrene or diluent content of the resin mix can vary between about 10 and 40%. As the amount of diluent is increased, the viscosity of the mix is lowered and some pre-heating, as hereinafter described, may be required to bring the viscosity within the useful range.

The chemical composition of the light-transmitting resin material varies widely in commercially available materials. The specific composition is not important for purposes of the invention, but it is necessary that the resin material used has a viscosity of 8000 to 60,000 centipoises at 25° C., which corresponds to the temperature at the time that the resin mix reaches the extrusion nozzle. If the viscosity of the resin mix is below 8000 centipoises, the oriented particle would be disturbed by Brownian motion. If the viscosity is greater than 60,000 centipoises, the elimination of entrained air is extremely difficult. If the original resin material used has a viscosity of less than 8000 centipoises, heat can be applied at the forming part 5 using a water jacket, infrared heater, or band heater, before the resin reaches the extrusion nozzle 6.

The amount of pearl pigment added to the light-transmitting resin material can vary between about 0.1 and 5% by weight, depending upon the shape and thickness of the product being cast and the quality of the pigment being used. In the case of iridescent pearl essence, best results are obtained using from 0.1–1% by weight. If white pearl essence is used for the preparation of thin cast sheets for decorative plywood, the preferred range is between 1 and 2% by weight.

Commercially available synthetic pearl essence contains approximately 35–40% solids suspended in a suitable vehicle. Any synthetic or natural pearl essence can be used in my process, including basic lead carbonate, lead hydrogen arsenate, lead hydrogen phosphate, bismuth oxychloride, or titanium dioxide, which may be coated on a substrate, such as mica. Because of its high luster, the basic lead carbonate, including both the white iridescent crystals, is preferred.

When polyesters are used in the method of the invention, the initial mixture of polyester contains a small amount of promoter or accelerator, usually an organic cobalt compound, such as cobalt naphthenate, in a trace amount—i.e., about 0.001–0.1% by weight, based on the weight of the polyester resin mix. Subsequently, the catalyst, usually a peroxide compound such as methylethyl ketone peroxide or acetyl peroxide, is added in an amount ranging between 0.1 and 2% by weight. The mixture containing resin promoter and catalyst is charged into a feed storage tank. If the two-tank system is used according to the invention, a mix of polyester containing promoter is charged to one of the tanks and a second mix containing catalyst is charged to the other tank.

As the extrudate leaves the extruder nozzle, it is almost immediately covered on both sides with a plastic film to protect it from the open air. Plastic films can be made of any suitable materials, such as polyethylene, polypropylene, cellophane, or polyester. If the cast material is to be used for button blanks, polyethylene films are the most convenient.

The speed of extrusion according to the method of the invention is related to the gel time of the system, which, in turn, must be considered in designing the conveyer part of the apparatus. For example, if the gel time of the system is ten minutes, a speed of 20 centimeters per minute requires a conveyer two meters in length. If the gel time is longer, the conveyer portion of the apparatus will have to be correspondingy lengthened. A practical range for the linear speed of extrusion ranges between 10 and 200 centimeters per minute, preferably 20–50 centimeters per minute.

It is preferable to use a resin system having a short gel time so that the apparatus can be more compact. Gel times of 5–20 minutes are acceptable from the standpoint of practical operation. To gel or solidify the resin in the heating section of the apparatus, temperatures of 30–40° C. are sufficient and temperatures of 30–35° C. are preferred.

Figure 5:
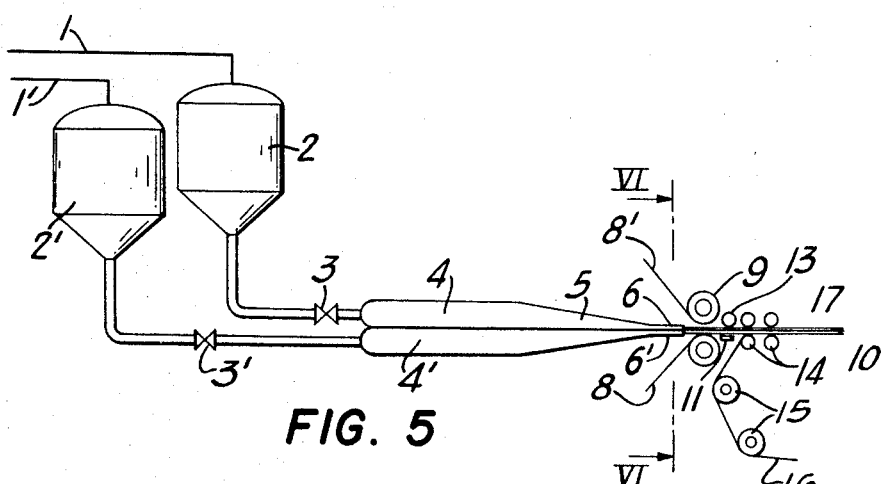
FIG. 5 shows an alternate embodiment in which separate extrusion nozzles are used.
Figure 6:
FIG. 6 is a sectional view taken across line VI—VI of FIG. 5.

FIGS. 5 and 6 show a special embodiment of the invention in which a twin-mouth nozzle (FIG. 6) is used to extrude into two layers two different resin flows; one being of pearlescent resin composition and the other being of white pigment resin composition. Using this technique, buttons simulating natural shells can be produced; such buttons having a lustrous face and a translucent back. Also, by applying the two nozzle techniqe using iridescent pearl composition, a sheet can be provided having an intense multi-color effect. The method of mixing the two kinds of resin stock becomes clear from a study of FIG. 5, showing the storage tanks 2 and 2' with the flow of each resin mix being controlled by the valves 3 and 3' into mixing sections 4 and 4'. The double layer extrudate is formed in forming parts 5 and 5'and passes through twin nozzles 6 and 6'. The cross-sectional view taken along line VI—VI shows how the twin extrusion is immediately laminated into a single sheet. If white pigment rather than pearl essence is used in one of the resin mixes, no orienting device is required in the mouth nozzle 6'.

Most of the foregoing description has been directed to the production of cast sheet. By devising appropriate forms of the mouth nozzle, receiving station, and conveyer rolls, semi-column rods, waved plates, triangular sectional rods and column rods can be made according to the method of the invention.

My invention is further illustrated by the following examples:

EXAMPLE I

A 100 kg. quantity of polyester resin, 77% of a butylene glycol maleate-sebacate polyester containing an equal ratio of acid components in 23% styrene, having a viscosity of 12,000 poises at 25° C. is stirred with 1.5 kg. of basic lead carbonate nacreous pigment (crystal concentration 50%) for thirty minutes to obtain a uniform dispersion. The mixture is divided into two equal parts and cobalt naphthenate (a styrene monomer solution containing 10% by weight as cobalt) is added in the amount of 0.005 kg. to one part. To the other part is added 0.05 kg. of methylethyl ketone peroxide (as a 60% solution in dibutylphthalate). The solutions are stirred for about thirty minutes and then charged separately into the storage tanks. With the control valves closed, the air is removed through the tanks by applying a reduced pressure of 0.1 atmosphere for twenty minutes. After the air bubbles are completely eliminated, high pressure air is introduced to the tanks to maintain the internal pressure at 1.5 atmospheres. The control valves are then carefully opened to allow the resin stocks to flow to the mixing tube.

The resins are combined in the mixing tube and then formed as a sheet flow by passing through the forming part of the extruder. The rein is then extruded from the mouth nozzle and the flow rate of the resin to the mixing tube is adjusted so as to maintain a linear extrusion speed of 50 centimeters per minute. The platelet particles of the lead carbonate pigment are forced to be oriented by the passage of the rein through the parallel thin plates positioned in the mouth nozzle. As the extrudate leaves the extruder nozzle, it is immediately covered on both sides with polyethylene film and transferred onto the conveyer belt. The set form of the extrusion is maintained by the special shape of the conveyer rolls and the receiving station. The resin, covered with the polyethylene films, is brought adjacent infrared lamps serving as a heat source by the synchronized movements of the films and the conveyer. The infrared lamps heat the resin at 35° C., which is a temperature sufficient to cause gelation as the encased resin travels the length of the five meter belt. The solidified resin is carried by driving rolls to a table ten meters in length where it is heated to a slightly higher temperature of 38–40° C. to accelerate solidifiation. Following the table, a conventional type button blanking machine is placed and the resin is still sufficiently soft to be punched into blanks. Curing of the blanks is done by known means and the film residues are removed by a conventional air separator.

EXAMPLE II

A dual nozzle apparatus as shown in FIG. 5 is used for this example. To one of the storage tanks, a pearlized polyester resin, such as that used in Example I, is charged. To the other tank is charged a polyester resin mix containing three percent of titanium white instead of pearl pigment. Extrusion is carried out as is described in Example I. This modification provides buttons similar to natural shell buttons in that one side of the button is lustrous and the other translucent.

EXAMPLE III

Figure 3B:
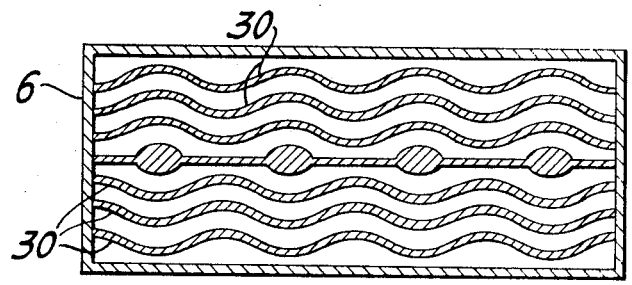
FIG. 3(a) is a sectional view taken across line III—III of FIG. 2.

The apparatus used for this example is that of FIG. 5, adapted with a thin plate arrangement in the nozzle mouths as shown in FIG. 3(b). Pearlized resin mixes are prepared as described in Example I; one mix containing blue-green lead carbonate pearl essence and the other containing pink lead carbonate pearl essence. The extrusion process is carried out as described in Example I. The resulting button blanks show multi-color iridescent effect; green, pink, and blue colors appearing according to the angle of observation, as in the natural mother-of-pearl. Color intensification in multi-color castings is achieved by the orientation of the different colored pigment crystals at different angles with respect to each other; e.g., blue-green crystals oriented parallel to each other in one plane and pink crystals oriented parallel to each other in a second plane not parallel to the first. This effect is achieved using the thin plate arrangement of FIG. 3(b).

EXAMPLE IV

In this example a patterned roll is placed above the table. The roll contains an internal heat source to aid in the engraving, and pressure is supplied through the pattern roll against the table. Through the polyethylene film the pattern is printed on the face of the resin sheet and fixed by curing. The button blanks obtained by the method of this example retain internal pressing marks, because the orientation of the pigment within the blank is changed parallel to the engraved patterns. The blanks are made by the process of Example I with the exception that the thickness of the resin flow is increased by one mm. by adjusting the clearance of the extrusion nozzle.

EXAMPLE V

In this example laminated internal wall panels are made by providing a subsequent lamination step. Cellophane film and polyester film are used in place of the polyethylene films of Example I. The resin flow is introduced to an auxiliary table on which is placed a plywood plate surface coated with activated adhesive resin, colored if desired by a suitable pigment. The resin sheet should be kept apart from the surface of the wood plate until the full length of the plate is fixed and then pressed on the surface and cut to the proper length by a knife. The laminated plywood is then brought to a heat press. Lamination is effected by heating to a temperature of 80° C. at a pressure of 10 kg. per square centimeter.

EXAMPLE VI

If the procedure of Example I (with the omission of the button blanking operation) is repeated using partially polymerized methylmethacrylate monomer having a viscosity of 25,000 cps. a beautiful cast acrylic sheet having high luster is provided.

I claim:

1. A continuous method of casting a liquid plastic mix having a viscosity of 8,000 to 60,000 centipoises consisting essentially of a light-transmitting resin and pearl essence, comprising:
   (a) continuously passing said plastic mix at a linear flow speed of 10 to 200 centimeters per minute through an extrusion zone containing a plurality of thin plates in prearranged spaced relationship which stratifies the mix into thin layers each having pearl essence oriented in layers arranged parallel to direction of flow;
   (b) continuously passing the extrudate between two plastic films to cover said extrudate and to insulate it from the open air;
   (c) continuously maintaining the form of the insulated extrudate while positioning it adjacent a heat source;
   (d) continuously applying heat to the insulated extrudate to solidify the resin, thereby fixing the orientation of the pearl essence; and
   (e) removing the cast resin material from said heat source at a rate in synchronization with the linear flow speed of the extrudate leaving the extrusion zone.

2. Method according to claim 1 wherein the light-transmitting resin is a polyester.

3. The method according to claim 1 wherein the pearl essence is basic lead carbonate.

4. Method according to claim 1 wherein the extrusion zone is divided into separate chambers in which different plastic mixes are introduced and the extrudate leaving the extrusion zone contains a plurality of layers.

5. Method according to claim 4 wherein at least one of said layers contains iridescent pearl essence.

References Cited

UNITED STATES PATENTS

| | | | |
|---|---|---|---|
| 3,168,509 | 2/1965 | Juel | 264—108 |
| 3,230,284 | 1/1966 | Iverson et al. | 264—73 |
| 3,269,882 | 8/1966 | Willy | 264—236 |
| 3,315,019 | 4/1967 | Fischler | 264—73 |
| 3,383,448 | 5/1968 | Bader et al. | 264—171 |
| 3,432,588 | 3/1969 | Breidt, Jr., et al. | 264—171 |
| 3,443,277 | 5/1969 | Frielingsdorf | 264—171 |

ROBERT F. WHITE, Primary Examiner

G. AUVILLE, Assistant Examiner

U.S. Cl. X.R.

264—75, 108, 236